United States Patent
Klingbeil et al.

(10) Patent No.: US 11,835,002 B2
(45) Date of Patent: Dec. 5, 2023

(54) METHODS AND SYSTEMS FOR COMPRESSION IGNITION IN A MULTI FUEL ENGINE

(71) Applicant: Transportation IP Holdings, LLC, Norwalk, CT (US)

(72) Inventors: Adam Edgar Klingbeil, Ballston Lake, NY (US); Eric Dillen, Edinboro, PA (US); Thomas Michael Lavertu, Ballston Lake, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/644,326

(22) Filed: Dec. 14, 2021

(65) Prior Publication Data
US 2023/0184181 A1 Jun. 15, 2023

(51) Int. Cl.
*F02D 19/06* (2006.01)
*F02D 41/06* (2006.01)
*F02D 41/00* (2006.01)

(52) U.S. Cl.
CPC ....... *F02D 19/0694* (2013.01); *F02D 19/061* (2013.01); *F02D 19/0689* (2013.01); *F02D 41/0047* (2013.01); *F02D 41/062* (2013.01); *F02D 2200/021* (2013.01); *F02D 2200/101* (2013.01)

(58) Field of Classification Search
CPC .............. F02D 19/0694; F02D 19/061; F02D 19/0689; F02D 41/0047; F02D 41/062; F02D 2200/021; F02D 2200/101
See application file for complete search history.

(56) References Cited

U.S. PATENT DOCUMENTS

| | | | | |
|---|---|---|---|---|
| 4,112,875 A | * | 9/1978 | Fletcher | F02B 43/10 123/3 |
| 7,036,616 B1 | * | 5/2006 | Kejha | B60L 50/16 903/908 |
| 7,047,909 B1 | * | 5/2006 | Botti | F02B 7/02 123/304 |
| 9,026,339 B1 | * | 5/2015 | Sturman | F02D 19/10 123/525 |
| 9,371,789 B2 | * | 6/2016 | Rosswurm | F02D 41/0027 |
| 9,631,548 B2 | * | 4/2017 | Weber | F02D 15/00 |
| 2007/0199539 A1 | * | 8/2007 | Lennox | F02M 47/027 123/304 |
| 2010/0229838 A1 | * | 9/2010 | Sturman | F01L 1/28 123/525 |
| 2014/0069386 A1 | * | 3/2014 | Coldren | F02D 19/0689 123/456 |
| 2014/0238340 A1 | * | 8/2014 | Dunn | F02D 19/0642 123/299 |
| 2021/0404371 A1 | * | 12/2021 | Yerace | F02D 19/081 |
| 2021/0404372 A1 | * | 12/2021 | Klingbeil | F02D 29/02 |
| 2022/0018297 A1 | * | 1/2022 | Blumreiter | F02D 13/06 |
| 2022/0112856 A1 | * | 4/2022 | Hart | F02D 23/02 |

FOREIGN PATENT DOCUMENTS

GB 2570344 A * 7/2019 ......... F02D 19/0615

* cited by examiner

Primary Examiner — Carl C Staubach
(74) Attorney, Agent, or Firm — McCoy Russell LLP

(57) ABSTRACT

Various methods and systems are provided for using only hydrogen as fuel in a duel fuel engine. In one example, a method may include direct injecting only hydrogen as fuel to one or more engine cylinders and compression igniting the injected hydrogen.

20 Claims, 5 Drawing Sheets

METHODS AND SYSTEMS FOR COMPRESSION IGNITION IN A MULTI FUEL ENGINE

BACKGROUND

Technical Field

Embodiments of the subject matter disclosed herein relate to a multi fuel engine system and more specifically, to a method to inject only hydrogen as fuel, and compression ignite the hydrogen.

Discussion of Art

Vehicles, such as rail vehicles and other off-highway vehicles, may utilize a dual fuel or multi fuel engine system for propulsion. The dual fuel engine system may allow vehicle navigation to be driven by torque produced through combustion of more than one type of fuel at an engine. In some examples, the more than one type of fuel may include hydrogen and diesel. A substitution ratio such as a percentage of total fuel energy provided by a second fuel may be adjusted to adjust engine power output, emissions, engine temperature, and so forth. Combustion parameters may vary according to a ratio of hydrogen to diesel injected at the engine due to different physical properties of the fuels. For example, hydrogen may have a higher energy density, lower ignition energy, and wider range of flammability than diesel. Further, hydrogen has no carbon content. As such, engine efficiency, power output, and emissions may be affected by co-combustion of hydrogen and diesel or combustion of each of the fuels separately. It may be desirable to have a system and method that differs from those that are currently available.

BRIEF DESCRIPTION

In one embodiment, a method for an engine in a vehicle may include injecting only hydrogen as fuel to one or more engine cylinders and compression igniting the injected hydrogen.

In this way, by operating the engine with only hydrogen as fuel and compression igniting the hydrogen, emissions levels may be reduced and engine performance may be improved without any additional engine components. An amount of hydrogen injected every engine cycle may be adjusted based on one or more of a torque demand, an engine speed, and an engine temperature. For each engine cycle, a first portion of the amount of hydrogen to be injected may be injected first and then a second, remaining portion of the amount of the hydrogen to be injected every engine cycle may be injected. The injection of hydrogen may be carried out via high pressure direct injection.

DETAILED DESCRIPTION

Figure 1:
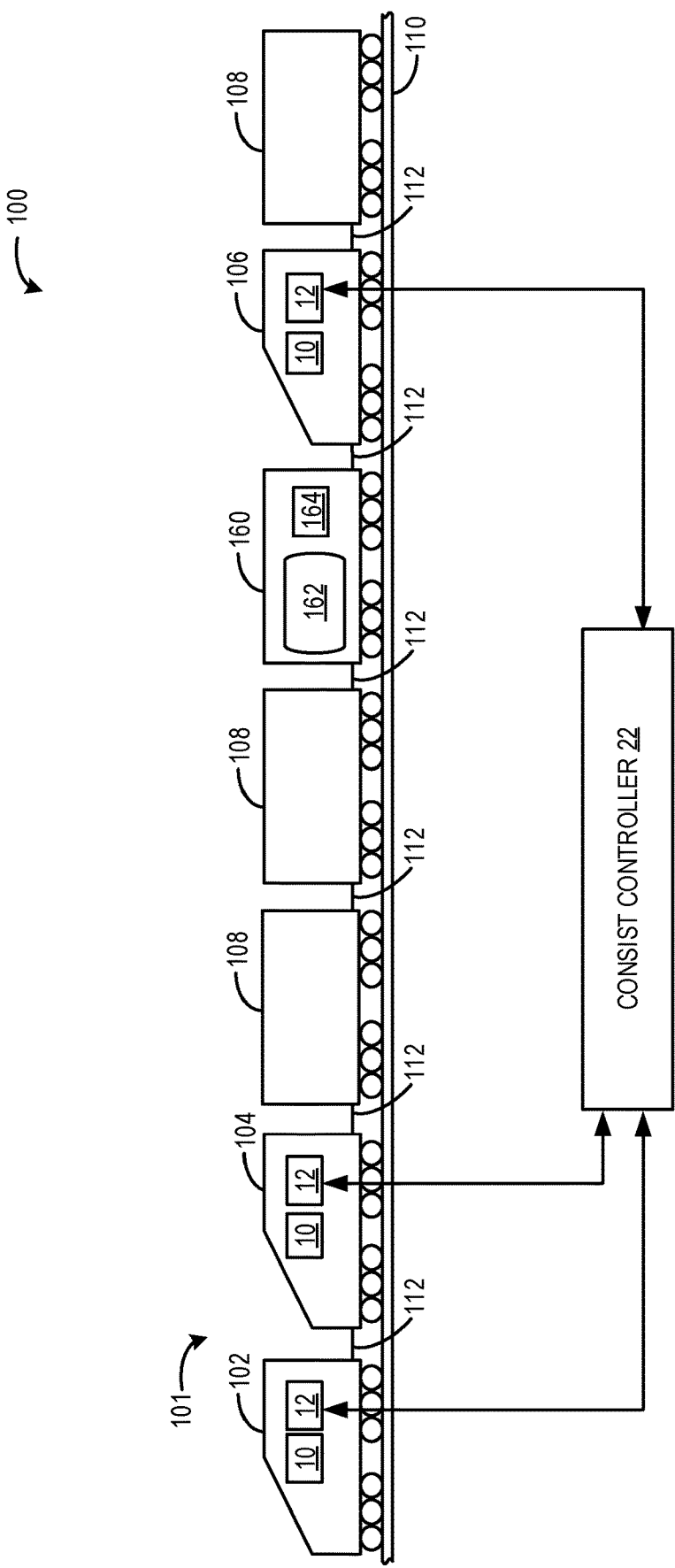
FIG. 1 shows an example embodiment of a train including a rail vehicle consist.

The following description relates to a system and methods for selectively injecting only hydrogen as fuel and compression igniting the hydrogen in the cylinders in a dual fuel engine system.

In a dual fuel engine, two fuels such as diesel and hydrogen may be used in combination or separately for combustion. As one example, diesel may be compression ignited in the engine cylinders. The cylinders may not include a dedicated igniter such as a spark plug for use with another fuel. Upon conditions being met, the engine may be operated by only injecting hydrogen to the engine cylinders without diesel and then compression igniting the hydrogen without use of spark ignition. The hydrogen may be injected via a direct injector (DI) under high pressure. The DI may be periodically lubricated by injecting a liquid fuel such a diesel via the same DI used to inject the hydrogen. Alternatively, the injector may be lubricated by the engine lube oil or diesel fuel without intentional injection of those fluids. In order to further improve emissions quality, a portion of the exhaust gas from the engine cylinders may be recirculated as exhaust gas recirculation (EGR).

In some embodiments, the engine may be disposed in a vehicle. Suitable vehicles may include a rail vehicle. In addition to rail vehicles, the approach described herein may be employed in a variety of other types of vehicles and with other engine types, and with a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, and other off-highway vehicles (OHV). For clarity of illustration, a locomotive is provided as an example of a mobile platform supporting a system incorporating an embodiment of the invention.

Embodiments of the invention are disclosed in the following description, and may relate to methods and systems for operating an internal combustion engine (ICE). The ICE may operate via a combination of different fuels as a mixture, and in different proportions relative to each other to form a substitution ratio of one fuel relative to another. These fuels may have relatively different amounts of carbon and suitable fuels may include one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels and liquid fuels, alone or in combination. The substitution ratio of a primary fuel of the ICE with a secondary fuel may be determined by a controller. The controller may determine the substitution ratio based at least in part on a current engine load. The controller may determine the substitution ratio based at least in part on the fuels used in the mixture, and their associated characteristics. The substitution ratio may be defined as a percentage of total fuel energy provided by the second fuel. In one embodiment, the substitution ratio may correspond to an injection amount of a fuel with a relatively lower carbon content or zero carbon content (e.g., hydrogen gas or ammonia). As the substitution ratio increases, the relative proportion of fuel with the lower or zero carbon content increases and the overall amount of carbon content in the combined fuel lowers.

Before further discussion of the methods for operating a dual fuel engine by only injecting hydrogen, an example platform in which the methods may be implemented is shown. FIG. 1 depicts an example train 100, including a plurality of rail vehicles 102, 104, 106, a fuel tender 160, and rail cars 108. These may run on a track 110. The plurality of rail vehicles, the fuel tender, and the cars are coupled to each other through couplers 112. In one example, the plurality of rail vehicles may be rail vehicles (locomotives), including a lead locomotive 102 and one or more remote locomotives 104, 106. While the depicted example shows three locomotives, one fuel tender, and four cars, any appropriate number of locomotives, fuel tenders, and cars may be included in the train 100. Further, the locomotives in the train may form a consist. For example, in the embodiment depicted, the locomotives may form a consist 101. Various vehicles may form vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by an engine 10, while the cars may be non-powered. In one example, the engine may be a dual fuel or multi fuel engine. For example, the engine may combust hydrogen and diesel, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel. The train may include a control system. The control system may include at least one engine controller 12 and it may include at least one consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller may be coupled to each engine controller for adjusting engine operations of each locomotive. As elaborated with reference FIG. 5, each engine controller may determine an engine speed, an exhaust temperature, an engine fueling demand, and an engine load, and, in response to a lower than threshold engine load and a lower than threshold engine fueling demand, may inject only hydrogen to each of the engine cylinders while disabling injection of another fuel.

The train may include at least one fuel tender, which may carry one or more fuel storage tanks 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive.

Figure 2:
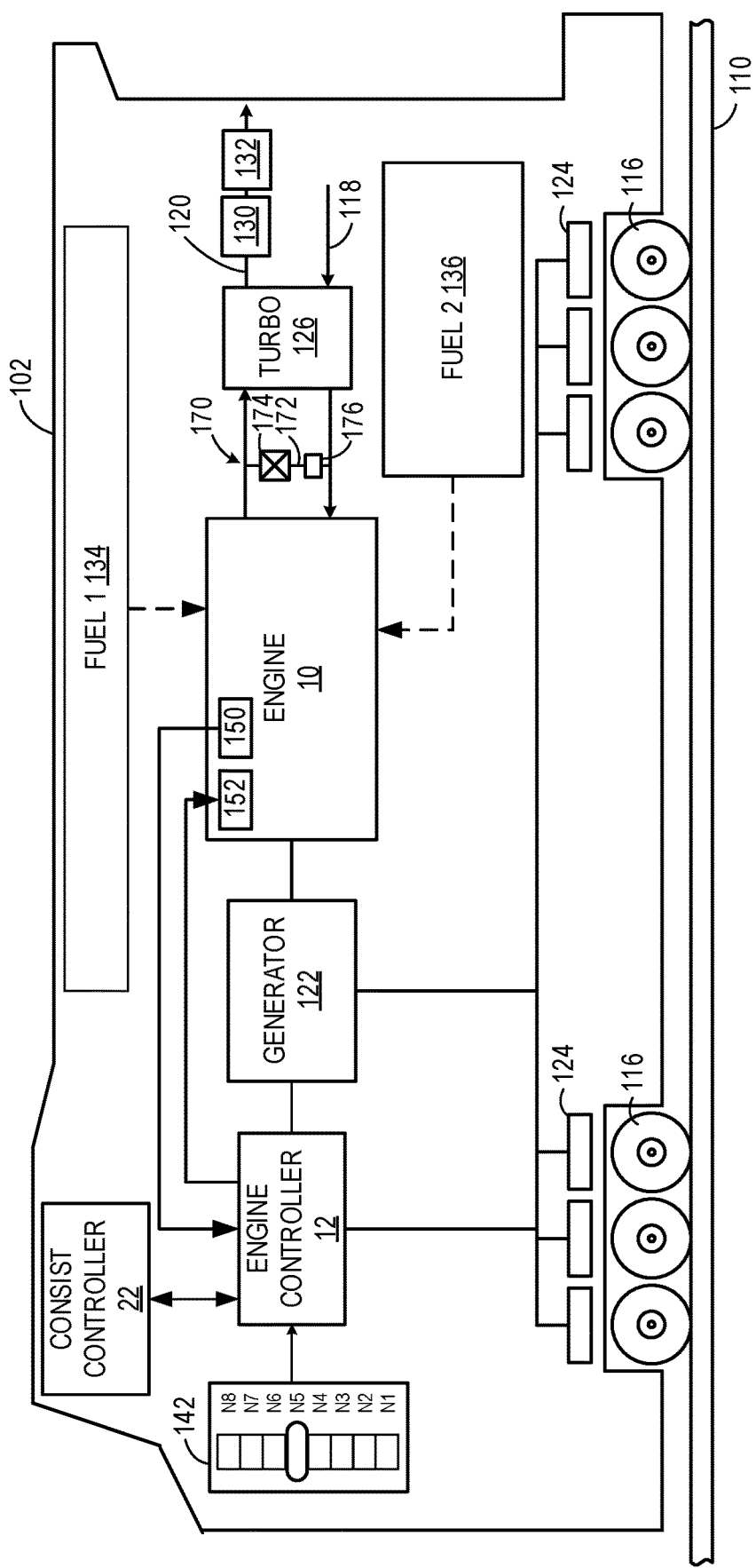
FIG. 2 shows a schematic diagram of an example embodiment of a locomotive from FIG. 1 with a dual fuel engine.
Figure 3:
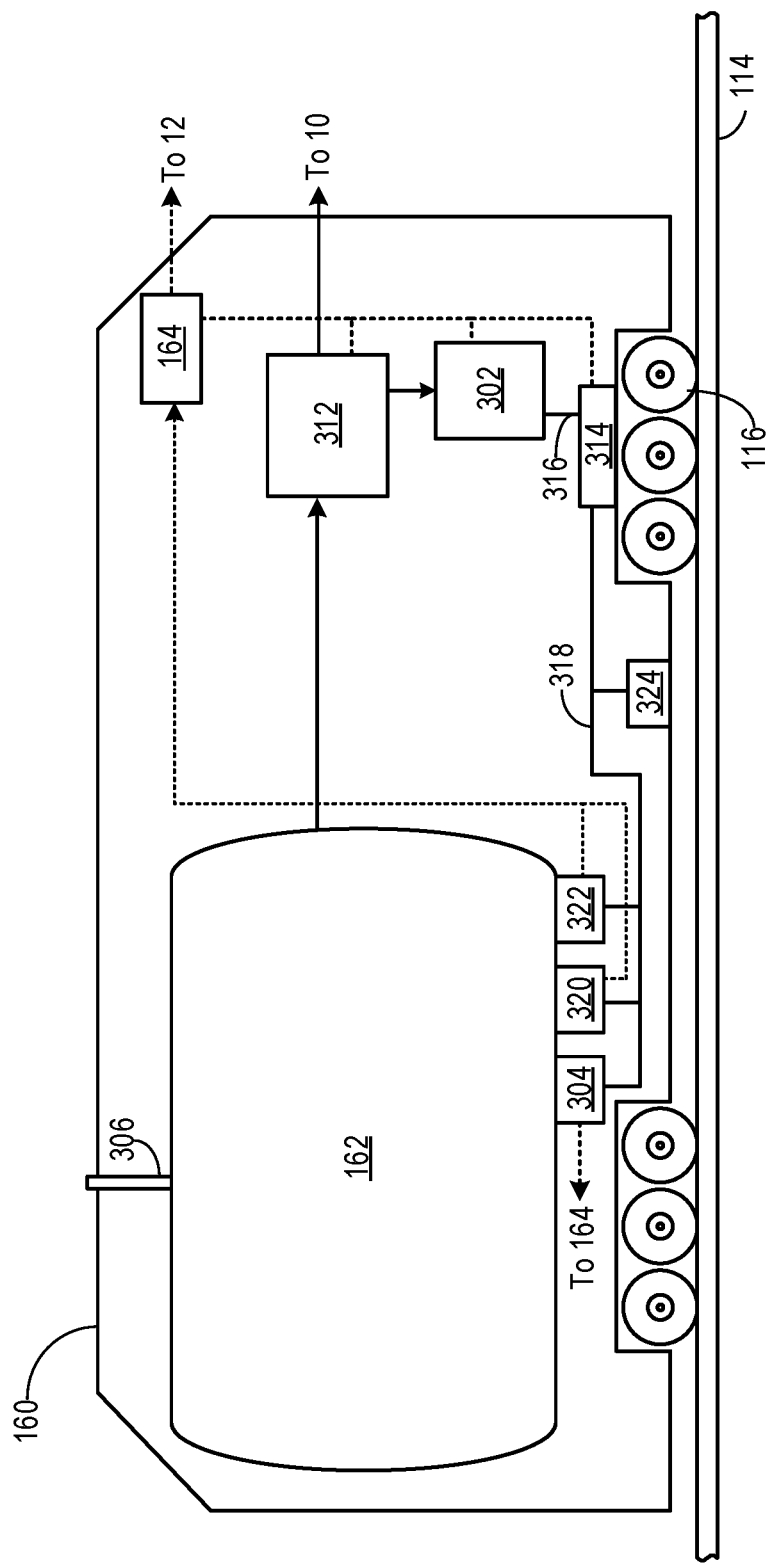
FIG. 3 shows an example embodiment of a fuel tender which may be included in the train of FIG. 1.

In one example, the fuel tender may be un-powered, e.g., without an engine or electric traction motors (e.g., electric traction motors 124 shown in FIG. 2). However, in other examples, the fuel tender may be powered for propulsion. For example, as shown in FIG. 3, the fuel tender may include an engine. The engine of the fuel tender may combust the fuel stored in the fuel storage tank and/or fuel stored at another vehicle of the train.

The one or more fuel storage tanks of the fuel tender may have a suitable structure for storing a specific type of fuel. In one example, the fuel storage tank may be adapted for cryogenic storage of liquefied natural gas (LNG) or liquefied hydrogen. As another example, the fuel storage tank may be used to store a fuel in a liquid state at ambient temperature and pressure, such as diesel or ammonia. In yet another example, the fuel storage tank may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may store a fuel cell system, including a fuel cell and one or more tanks of compressed hydrogen gas. Alternatively or additionally, a fuel cell system may be stored at one or more of the locomotives.

FIG. 2 depicts an example embodiment of a that can run on the track 110 via a plurality of wheels 116. Power for propulsion of the locomotive may be supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine. In another embodiment, the engine operates as a spark ignition engine The engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender 160 of FIG. 1. Alternatively, a third fuel may be stored at the fuel tender in addition to the first fuel at the first fuel reservoir and the second fuel at the second fuel reservoir of the locomotive. In one example, fuels which may be stored at ambient pressure and temperature without additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., fuels stored on-board the train) may each be different fuel types. A suitable fuel may be hydrocarbon-based fuels, such diesel, natural gas, methanol, ethanol, dimethyl ether (DME), etc. Alternatively, the fuels may be non-hydrocarbon-based fuels, such as hydrogen, ammonia, etc. The fuels listed above are non-limiting examples of fuels which may be combusted at the engine, and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible. Suitable combinations may be determined based at least in part on compatibility of the fuels and other application specific parameters. A method of delivery of the fuels to the engine for combustion may depend on properties of the fuel type and other application specific parameters.

When the engine is a single fuel-combusting engine (either spark ignition or compression ignition), the engine may consume a single liquid phase fuel. For example, the engine may combust hydrogen, ammonia, LNG, or a different gaseous fuel, or may combust diesel, gasoline, kerosene, or alcohol or a different liquid phase fuel.

A fuel that is stored on-board in one physical state, e.g., gas or liquid, may be delivered to the engine in the same state or in a different state depending on the embodiment. For example, LNG may be stored cryogenically in the liquid phase but may undergo a transition to the gas phase, e.g., at a regasification unit in the fuel tender, prior to injection at the engine. Other fuels, may be stored as a liquid and injected as a liquid or stored as a gas and injected as a gas. Reference to gaseous and liquid fuels mainly refers to a fuel's state as it is introduced into a cylinder or during its injection.

Fuels may be injected at the engine according to more than one injection technique depending on the embodiment. In one example, one or more of the fuels may be delivered to the engine cylinders via an indirect injection method. Suitable indirect injection methods may include port injection. In another example, at least one of the fuels may be introduced to the engine cylinders via direct injection. In yet another example, at least one of the fuels may be injected by central manifold injection. Depending on the embodiment, the engine may receive the fuels exclusively by indirect injection, exclusively by direct injection, or by a combination of indirect and direct injections. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is also possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with boost air and/or EGR to enhance the combustibility and vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may also be either port injected or direct injected. In some instances, the engine may have fuel injectors capable of switching between injection of gaseous fuels and of liquid fuels.

The fuels combusted by the dual fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidically coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). In the HPDI, the fuel pressure may be raised higher than a threshold pressure via a fuel system pump and then the fuel may be directly delivered to the cylinder. When direct injected, the fuels may not be premixed, in one example. However, in another example, premixing may be enabled by direct injection of one or more of the fuels prior to or early in a compression stroke of the engine cylinders, as described above.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution rates of hydrogen, e.g., substituting for diesel, for example, thereby decreasing hydrocarbon, NOx, and particulate matter emissions during engine operation.

An injection ratio of the fuels for co-combustion may vary according to operating conditions. For example, when the first fuel is hydrogen and the second fuel is diesel, a hydrogen-diesel ratio may be decreased in response to an increase in power demand at the engine. The adjusting of the ratio of diesel to hydrogen may be further based on a geographical location of the vehicle, and the fraction of the hydrogen injected may be increased in response to the geographical location of the vehicle being a green state.

As an example, during a first condition, a mixture of diesel and hydrogen may be injected to a cylinder of the engine and the mixture may be compression ignited, and during a second condition, only hydrogen may be injected to the cylinder of the engine and the hydrogen may be compression ignited. The first condition may include an engine temperature being lower than a threshold engine temperature and the second condition may include the engine temperature being higher than the threshold temperature and a level of hydrogen in a fuel reservoir being higher than a threshold level. Each of the diesel and hydrogen may be injected via a high pressure direct injector coupled to the cylinder. During the second condition, when the engine is operated only with hydrogen as fuel, for each engine cycle, the hydrogen may be injected in two or more batches to improve combustion. Also, to reduce NOx emissions, an amount of exhaust gas recirculation (EGR) may be supplied to each cylinder, the amount of EGR based on engine operating conditions or ambient conditions such as an engine load, an engine speed, and the intake temperature, air flow rate, air-fuel ratio, exhaust emissions, ambient pressure, altitude, ambient temperature. During the second condition, when the engine is operated only with hydrogen as fuel, injection of hydrogen may be suspended or reduced and diesel may be injected through the direct injector for one or more engine cycles periodically after every threshold number of engine cycles to lubricate the injector.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may further include one or more turbochargers 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. As an example, as elaborated with relation to FIG. 4, the EGR system may be a donor cylinder EGR system where one or more cylinders provide exhaust gas only to the EGR passage, and then to the intake.

The locomotive may include an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, also known as particulate matter (an example of which is soot), produced during combustion. Suitable materials for producing the DOC may include ceramic, silicon carbide, cermets, or another material selected based on application specific parameters. In other embodiments, the exhaust gas treatment system may additionally include a selective catalytic reduction (SCR) catalyst, three-way catalyst, NO trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In one embodiment, the throttle opening may be adjusted to control fuel and/or air flow into a cylinder of the engine. In one embodiment, the throttle may have a plurality of notches, where each notch may correspond to a discrete power level. These discrete power levels may correspond to tuned, predetermined, high-efficiency operating points for the engine. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system available from Wabtec Corporation and/or a load distribution plan may be generated using consist optimization software such as Consist Manager available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine oil and water temperatures, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to control a signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push the train and the locomotive at the front of the train may pull the train, particularly during uphill navigation. As such, a greater load may be placed on the pushing locomotive at the end of the train.

Turning now to FIG. 3, an embodiment of the fuel tender 160 of FIG. 1 is shown. As described above, the fuel tender includes the fuel storage tank, the controller 164, and the engine 302. The fuel tender may further include a first unit 304, which may be a device for controlling a temperature and pressure within the fuel storage tank. For example, when LNG is stored in the fuel storage tank, the first unit may be a cryogenic unit. The fuel storage tank sizes and configurations may be selected based on end use parameters, may be removable from the fuel tender, and may receive fuel from an external refueling station via port 306.

The fuel storage tank may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage tank to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

Figure 4:
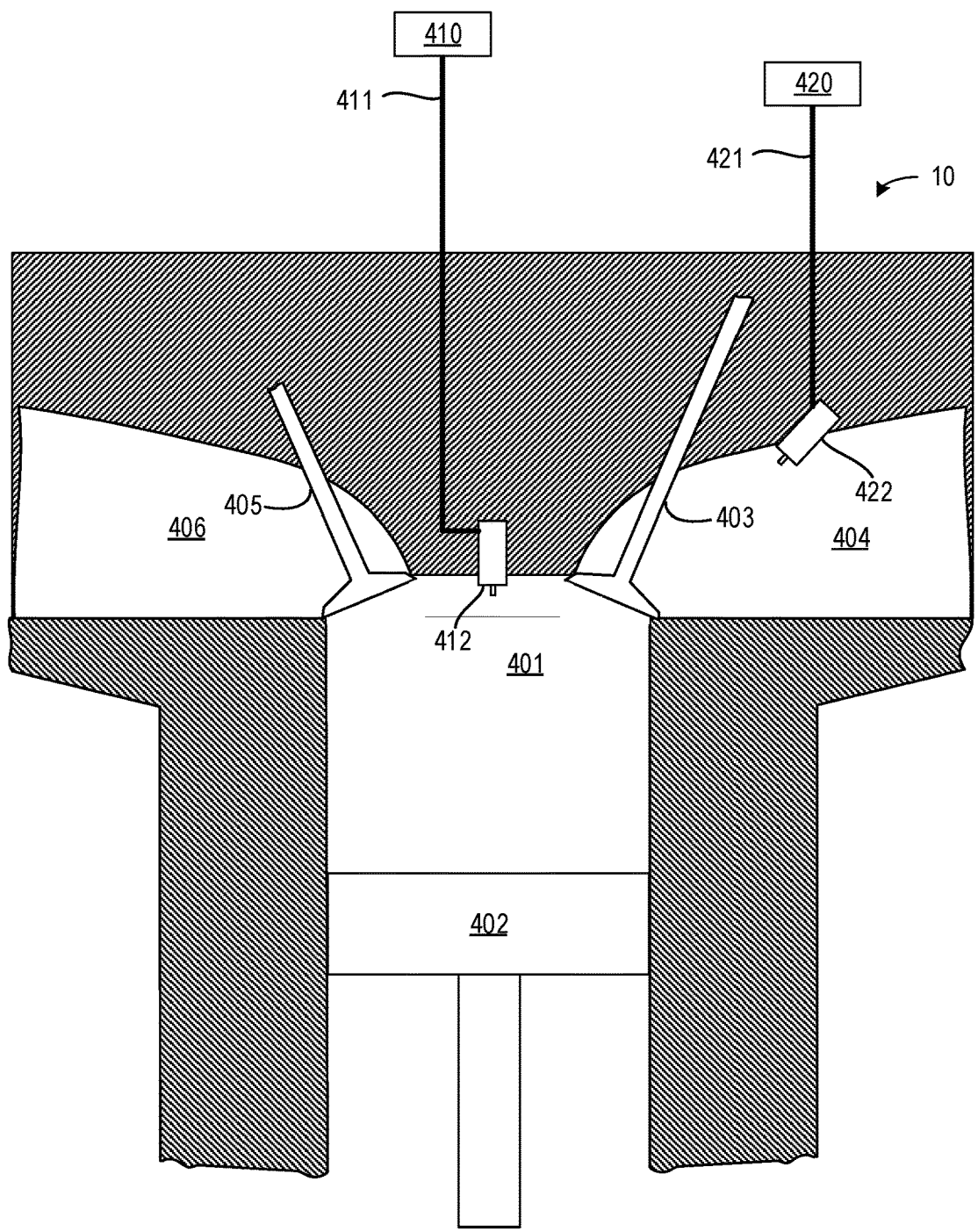
FIG. 4 shows a schematic diagram of an example cylinder of the dual fuel engine.

Turning now to FIG. 4, it shows an example cylinder 401 of the engine. The cylinder may be one of a plurality of cylinders that each include at least one intake valve 403, at least one exhaust valve 405. Each of the plurality of cylinders may include one or more direct injector 412 and/or one or more port injector 422. Each fuel injector may include an actuator that may be actuated via a signal from the controller of the engine. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the direct injector may receive fuel from a first fuel system 410 via a first fuel conduit 411. The port-fuel injector may receive fuel from a second fuel system 420 via a second fuel conduit 421. The first fuel system may supply a carbon-containing fuel and the second fuel system may supply a carbon-free fuel, or vice versa. Alternatively, both fuel systems may supply carbon-containing or carbon-free fuels and the fuel in the first fuel system may be the same as or different from the fuel in the second fuel system. The carbon-containing fuel may include one or more of gasoline, diesel, biodiesel, natural gas, HDRD, ether, syn-gas, kerosene, and alcohol. The carbon-free fuel may include one or more of ammonia, hydrogen, etc. In one example, each of the first fuel system and the second fuel system may be connected to an intake port 404, such that a fuel contained in either of the two fuel systems may be port injected via the same port injector Similarly, each of the first fuel system and the second fuel system may be connected to the direct injector, such that a fuel contained in either of the two fuel systems may be directly injected to the cylinder via the same direct injector. In some examples, the engine may be a spark-free engine. In other examples, the engine may be a spark-ignited engine.

In one example, the engine may combust one or more fuel types delivered thereto. For example, the direct injector may inject the first fuel directly to the cylinder and the port-fuel injector may inject a second fuel directly into the intake port. In one example, the first fuel is injected as a liquid fuel and the second fuel is injected as a gaseous fuel. The first fuel and second fuel may mix within an interior volume of the cylinder defined by cylinder walls, a cylinder head, and the piston 402. Following combustion, the exhaust valve may expel combustion products from the cylinder to an exhaust port 406.

During operation, each cylinder within the engine may use a four-stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) may be referred to by those of skill in the art as top dead center (TDC). In a process hereinafter referred to as direct injection, fuel is introduced into the combustion chamber. In some examples, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via adjusting one or more of an intake valve timing, a fuel injection timing, a fuel temperature, a fuel pressure, an engine speed, an engine load, an air temperature, an engine temperature, a spark-timing, and a boost pressure and/or a manifold pressure. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

In this way, the components described in FIGS. 1-4 enable a controller storing instructions in non-transitory memory that, when executed, cause the controller to: during an engine start, operate the engine by combusting only diesel in each engine cylinder of the engine, and in response to an engine temperature increasing to above a threshold temperature, switch to operating the engine by combusting only hydrogen in each cylinder of the engine. Each of the diesel and the hydrogen may be direct injected to each cylinder of the engine under high pressure, and compression ignited without spark.

In one embodiment, the engine controller may operate the engine with a first fuel mixture in a first operating mode and then switch to a second operating mode. For example, the engine may have a starting mode where diesel, or diesel and hydrogen, are combusted until a determined event. Determined events may include the elapse of a time period, the achievement of a determined temperature at a temperature sensor (such as a manifold temperature) and the like. Once the determined event is achieved, the controller may switch engine operation to a second mode, such as a hydrogen-only mode, or may just modify the substitution rate of diesel to hydrogen. Another determined event may be a transition of throttle levels in response to a call from an operator or a prognostic look-ahead by a vehicle controller in anticipation of an upcoming power demand change. In addition, the controller may respond by signaling the fuel system to adjust the amount of fuel being fed forward. The feed forward fuel system may include, for example, a re-gasifier or a solid hydrogen generator. These feed forward fuel systems may not be able to respond as quickly as desired and/or as quickly as the engine can change operating modes.

Figure 5:
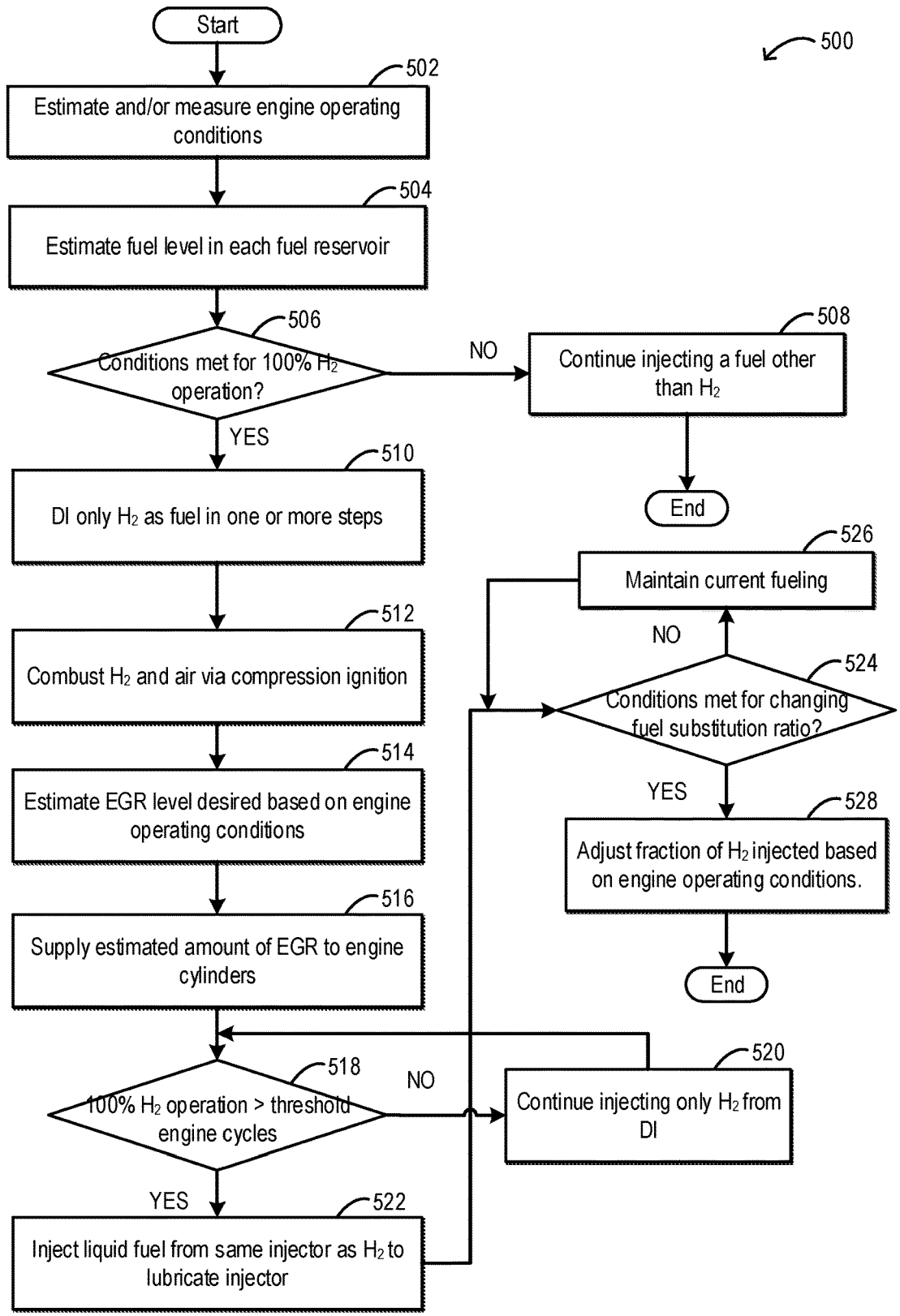
FIG. 5 shows a flow-chart illustrating an example routine for using hydrogen as the only engine fuel for combustion.

FIG. 5 shows a flow chart depicting a routine 500 for using hydrogen as the only fuel during operation of an engine in a vehicle (such as locomotive 102 in FIG. 2). Routine 500 may be carried out by controller 12 of engine 10 in FIG. 2, for example.

At step 502, engine operating conditions of the vehicle may be estimated or measured. As an example, the engine operating conditions may include engine speed, engine temperature, engine load, torque demand, boost demand, engine dilution demand, etc. The engine temperature may be the engine coolant temp, engine oil temperature, exhaust temperature, intake manifold temperature, compressor inlet temperature, compressor outlet temperature, turbine inlet/outlet temperature, and/or engine block temperature. Also, ambient conditions such as ambient temperature, pressure, and humidity may be estimated or measured. Further, the geographical location of the vehicle may be obtained from an on-board navigational system. In one example, the controller on-board the vehicle may include a navigation system (e.g., global positioning system, GPS) via which a location of the vehicle (e.g., GPS co-ordinates of the vehicle) may be retrieved. In another example, the location of the vehicle may be retrieved from an external network communicatively coupled to the vehicle. The geographical location of the vehicle may correspond to a regulation regarding carbon footprint from the vehicle operation at that location.

At step 504, a level of fuel in each fuel reservoir may be estimated or measured. As an example, fuel contained in a first fuel reservoir may be diesel, while the fuel contained in a second fuel reservoir may be hydrogen. Hydrogen may burn effectively at lean conditions without producing carbon dioxide as the product of combustion, thereby reducing emission of greenhouse gases. A level of diesel and hydrogen in the respective reservoirs may be estimated.

At step 506, the routine includes determining if conditions are met for operating the engine with 100% hydrogen (hydrogen being the only fuel injected). The conditions for only injecting hydrogen as fuel to the engine cylinders may include a higher than threshold engine temperature. The threshold temperature may be pre-calibrated based on the flammability of hydrogen and compression ratio of the engine cycle. If the temperature of the engine is lower than the threshold temperature, the hydrogen may not fully ignite, thereby reducing efficiency of the engine. Therefore, during conditions such as cold start, hydrogen may not be used as the only fuel. The conditions for only injecting hydrogen as fuel may also include a higher than threshold hydrogen level in the fuel reservoir.

If it is determined that conditions are not met for operation of the engine with hydrogen being the only fuel injected (100% hydrogen operation), at step 508, the engine may be continued to be operated by injecting a fuel other than hydrogen. In one example, a different fuel such as diesel may be solely injected and combusted. In another example, a mixture of two fuels may be injected, one of the two fuels being hydrogen. A fraction of hydrogen injected along with diesel may be adjusted based on engine operating conditions. In one example, the fraction of hydrogen may be decreased with an increase in one or more of the engine temperature, the engine load, or ambient temperature or a decrease in the engine dilution demand.

If it is determined that conditions are met for operation of the engine with hydrogen being the only fuel injected (100% hydrogen operation), at step 510, only hydrogen may be direct injected into the engine cylinders in one or more steps. The direct injection may be carried out at a higher pressure (such as in the range of 300 bar to 700 bar) by increasing pressure of the fuel in the fuel line via a high pressure fuel pump.

The total amount hydrogen injected during each engine cycle may be estimated and adjusted based on engine operating conditions including engine speed, engine temperature, and torque demand. In the one example, of the total amount of hydrogen to be injected in each engine cycle, a first portion of the hydrogen may be injected first (early injection) and then the remaining, second amount of hydrogen may be injected. In another example, the total amount of hydrogen to be injected may be slowly injected over a duration at the end of the intake stroke. In one example, the injection timing of hydrogen may be during the intake stroke when piston is more than 180 degrees before top dead center (TDC) and the direct injection may occur near TDC (in the range of 10 degrees before TDC to around TDC.

By directly injecting the fuel to the combustion chamber instead of premixing the fuel with another fuel, air, and/or EGR prior to delivery to the combustion chamber, propensity for knock may be reduced. After the hydrogen is injected, at step 512, the hydrogen mixed with air may combust via compression ignition. At a high engine temperature (such as 1000° C.), the injected hydrogen mixes with the oxygen in air and combusts upon compression. During multiple injections of hydrogen over one engine cycle, the first portion of hydrogen may combust first, causing some stratification of charge in the cylinder, followed by injection and combustion of the remaining amount of hydrogen. In this way, hydrogen may be effectively combusted by compression ignition without the need for additional components such as a spark plug.

At step 514, a desired level of EGR that may be supplied to the engine cylinders may be estimated. In one example, the controller may estimate the amount of EGR desired as a function of calculated or measured parameters engine operating conditions including engine temperature, engine speed, and torque demand, air flow, air fuel ratio, exhaust constituents, turbocharger speed, and the amount of hydrogen being injected to the engine cylinders. In another example, the controller may use a look up table to determine the desired level of EGR with the engine temperature, the engine speed, the torque demand, and the amount of hydrogen as inputs and the desired amount of hydrogen as output. By using EGR, NOx emissions from the engine may be reduced and emissions quality may be improved.

At step 516, the estimated amount of EGR may be supplied to the engine cylinders. The amount of EGR delivered may be adjusted by adjusting an opening of an EGR valve housed in an EGR passage connecting the exhaust passage to the intake manifold of the engine, the opening of the EGR valve directly proportional to the amount of EGR desired. The EGR may be mixed with the fuel and air within the engine cylinders during combustion (not pre-mixed).

At step 518, the routine includes determining if engine operation with 100% hydrogen injection (hydrogen as only fuel injected) has been carried out for over a first threshold number of engine cycles. The first threshold number of engine cycles may be pre-calibrated based on the injector and the propensity of loss of lubrication in the injector used for hydrogen injection. Since hydrogen is a gaseous fuel, upon using an injector to only inject hydrogen for over the first threshold number of engine cycle, the injector may lack lubrication which may cause mechanical wear and heating at the injector.

If it is determined that the engine operation with 100% hydrogen injection has been carried out for less than the first threshold number of engine cycles, lubrication of the injector may not be desired at this time. Therefore, at step 520, injection of only hydrogen may be continued from the direct injector. If it is determined that the engine operation with 100% hydrogen injection has been carried out for higher than the first threshold number of engine cycles, at step 522, a liquid fuel may be injected to the engine cylinder via the same direct injector used to inject hydrogen in order to lubricate the injector. In one example, the liquid fuel may be diesel. Diesel may be injected with the same injector, but through dedicated diesel holes that are different from the hydrogen holes (such as smaller holes may be used for diesel relative to hydrogen). The injector may be designed so that the diesel lubricates the gas components by leaking through small clearance passages in to the regions where the hydrogen components need lubrication. In another example, Diesel (or another lubricant) may be supplied to the injector as lubricant and not intentionally injected, but only used as lubricant. The diesel pressure in the injectors is desired to be higher than the pressure of hydrogen such that diesel flows into the components that actuate the flow of hydrogen.

A mixture of hydrogen and diesel may be injected for a second threshold number of engine cycles to lubricate the engine cylinders. In one example, the liquid fuel and hydrogen may be premixed and delivered via the same direct injector. In another example, the liquid fuel and hydrogen may be delivered one after the other from the same injector (but different holes) and combusted together within the cylinder via compression ignition. The amount of liquid fuel in the mixture may be determined based on the lubrication requirement of the injector.

The injection of the mixture of the liquid fuel and hydrogen may continue for a second number of engine cycles to ensure sufficient lubrication. The second number of engine cycles may be lower than the first threshold number of engine cycles. In one example, during the second number of engine cycles, only the liquid fuel may be injected (instead of the mixture of hydrogen and liquid fuel) to lubricate the injectors.

At step 524, the routine includes determining if conditions are met for changing substitution ratio of the fuel injected. In other words, instead of operating the engine with only hydrogen as fuel, the routine determines if it is desired to inject another fuel. In one example, conditions for changing the substitution ratio may include a change in engine operating conditions, such as an increase in torque demand and/or a change in engine temperature. If it is determined that conditions are not met for changing the substitution ratio, at step 526, current fueling of only hydrogen to the engine cylinders may be continued. If it is determined that conditions are met for changing the substitution ratio, at step 528, a fraction of hydrogen injected along with another fuel may be adjusted based on engine operating conditions. In one example, the fraction of hydrogen may be decreased with an increase in one or more of the engine temperature, the engine load, or ambient temperature or a decrease in the engine dilution demand. A fraction of diesel injected may be increased with an increase in engine torque demand. As an example, a higher percentage of hydrogen may be used during lower load conditions and higher temperature conditions. Further, during vehicle operation in green states (e.g., California), a higher percentage of hydrogen may be used to reduce carbon emissions. In one example, the fuel injected may include 70% hydrogen and 30% diesel. In the future, there may be regulations governing release of greenhouse gases, and a higher percentage of hydrogen may be used to reduce carbon emissions. Green states may be defined as states or regions where regulations set by governing agencies regarding greenhouse gas emissions are stricter than as compared to other states or regions, and a lower level of emissions is needed to be maintained relative to the other states or regions.

In this way, by operating an engine solely by injecting hydrogen, carbon dioxide release may be decreased, and emissions quality may be improved. The technical effect of injecting the hydrogen via direct injection and then compression igniting the hydrogen is that added components, such as spark plugs, may not be required for the engine cylinders. Due to the higher flammability of hydrogen, the hydrogen may burn effectively after compression ignition, thereby improving engine performance. By direct injecting the fuel without pre-mixing, the possibility of knock may be reduced. By increasing the use of hydrogen, the carbon deposition on engine components such as valves and exhaust may be reduced.

An example method for engine comprises: injecting hydrogen as fuel to one or more engine cylinders and compression igniting the injected hydrogen. In any of the preceding examples, additionally or optionally, the fuel injected is only hydrogen, the method further comprising, adjusting an amount of hydrogen injected in an engine cycle based on one or more of a torque demand, an engine speed, and an engine temperature. In any or all of the preceding examples, additionally or optionally, for each engine cycle, a first portion of the amount of hydrogen injected every engine cycle is injected first and then a second, remaining portion of the amount of hydrogen injected every engine cycle is injected. In any or all of the preceding examples, additionally or optionally, for each cylinder of the one or more engine cylinders, the injections of the first portion of the amount of hydrogen injected and the second portion of the amount of hydrogen injected are carried out via a high pressure direct injector coupled to the each cylinder. Any or all of the preceding examples, further comprising, additionally or optionally, upon injecting only hydrogen from the high pressure direct injector for a threshold number of engine cycles, injecting a different, liquid fuel from the high pressure direct injector for a first number of engine cycles. In any or all of the preceding examples, additionally or optionally, the different, liquid fuel is diesel. In any or all of the preceding examples, additionally or optionally, during injecting only hydrogen to each cylinder, supplying a first amount of exhaust gas recirculation (EGR) to each cylinder, the first amount of EGR mixing with the hydrogen within each cylinder. In any or all of the preceding examples, additionally or optionally, the first portion of EGR is adjusted based on one or more of engine load, the engine speed, the engine temperature, and the amount of hydrogen injected every engine cycle. In any or all of the preceding examples, additionally or optionally, the method further comprising, during an engine start, injecting each of diesel and hydrogen as fuel to the one or more engine cylinders, and in response to the engine temperature increasing to above a threshold temperature, switching to injecting only hydrogen to the one or more engine cylinders.

Another example method for a multi-fuel engine, comprises: during a first condition, injecting a mixture of diesel and hydrogen to a cylinder of the engine and compression igniting the mixture, and during a second condition, injecting only hydrogen to the cylinder of the engine and compression igniting the hydrogen. In any of the preceding examples, additionally or optionally, the first condition includes an engine temperature being lower than a threshold engine temperature and the second condition includes the engine temperature being higher than the threshold engine temperature and a level of hydrogen in a fuel reservoir being higher than a threshold level. In any or all of the preceding examples, additionally or optionally, each of the diesel and hydrogen is injected via a high pressure direct injector coupled to the cylinder. In any or all of the preceding examples, additionally or optionally, during the second condition, for each engine cycle, the hydrogen is injected in two or more batches. In any or all of the preceding examples, additionally or optionally, the method further comprising, during the second condition, supplying an amount of exhaust gas recirculation (EGR) to the cylinder, the amount of EGR based on one or more of an engine load, an engine speed, and an engine temperature. In any or all of the preceding examples, additionally or optionally, during the first condition, adjusting a ratio of hydrogen to diesel based on one or more of a torque demand, the engine speed, the engine temperature, and the level of hydrogen in the fuel reservoir. In any or all of the preceding examples, additionally or optionally, the method further comprising, during the second condition, suspending injection of hydrogen and injecting diesel through the high pressure direct injector for one or more engine cycles periodically after every threshold number of engine cycles. In any or all of the preceding examples, additionally or optionally, the method further comprising, during the second condition, switching from injecting only hydrogen to the cylinder to injecting one of the mixture of diesel and hydrogen, and only diesel in response to increase in torque demand to above a threshold demand.

Yet another example system for an engine, comprises: a controller storing instructions in non-transitory memory that, when executed, cause the controller to: during an engine start, operate the engine by combusting only diesel in each engine cylinder of the engine, and in response to an engine temperature increasing to above a threshold temperature, switch to operating the engine by combusting only hydrogen in each cylinder of the engine. In any of the preceding examples, additionally or optionally, each of the diesel and the hydrogen is direct injected to each cylinder of the engine under high pressure, and compression ignited without spark. In any or all of the preceding examples, additionally or optionally, the controller includes further instructions to: lubricate each injector used to direct inject hydrogen to the cylinder by injecting diesel through the injector after every threshold number of engine cycles with only hydrogen injection.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
injecting hydrogen as fuel to one or more engine cylinders via a corresponding direct fuel injector coupled to each of the one or more engine cylinders that is spaced away from an intake valve of the respective one or more engine cylinders;
compression igniting the injected hydrogen;
during injecting only hydrogen to the one or more engine cylinders, supplying an amount of exhaust gas recirculation (EGR) to each of the one or more engine cylinders through an EGR passage that is in fluidic communication with one or more intake valves of the one or more engine cylinders and one or more exhaust valves of the one or more engine cylinders, the amount of EGR mixing with the hydrogen within each of the one or more engine cylinders;
wherein the amount of EGR is adjusted based on the amount of hydrogen injected into the one or more engine cylinders;
continue injecting only hydrogen to the one or more engine cylinders via the corresponding direct fuel injector coupled to each of the one or more engine cylinders for a pre-calibrated number of engine cycles; then
responsive to injecting only hydrogen to the one or more engine cylinders via the corresponding direct fuel injector coupled to each of the one or more engine cylinders for the pre-calibrated number of engine cycles, inject a liquid fuel from the same corresponding direct fuel injectors that previously injected only hydrogen.

2. The method of claim 1, wherein the fuel injected is only hydrogen, the method further comprising, adjusting an amount of hydrogen injected in an engine cycle based on one or more of a torque demand, an engine speed, and an engine temperature.

3. The method of claim 2, wherein for each engine cycle, a first portion of the amount of hydrogen injected every engine cycle is injected first and then a second, remaining portion of the amount of hydrogen injected every engine cycle is injected.

4. The method of claim 3, wherein the corresponding direct fuel injector is a high pressure direct injector, wherein for each cylinder of the one or more engine cylinders, the injections of the first portion of the amount of hydrogen injected and the second portion of the amount of hydrogen injected are carried out via the high pressure direct injector coupled to each cylinder.

5. The method of claim 4, further comprising, upon injecting only hydrogen from the high pressure direct injector for a threshold number of engine cycles, injecting a different, liquid fuel from the high pressure direct injector for a first number of engine cycles.

6. The method of claim 5, wherein the different, liquid fuel is diesel.

7. The method of claim 1, wherein the liquid fuel is diesel, and wherein the pre-calibrated number of engine cycles corresponds to each injector's propensity for loss of lubrication.

8. The method of claim 1, wherein the amount of EGR is further adjusted based on one or more of engine load and the engine speed.

9. The method of claim 1, further comprising, during an engine start, injecting each of diesel and hydrogen as fuel to the one or more engine cylinders, and in response to the engine temperature increasing to above a threshold temperature, switching to injecting only hydrogen to the one or more engine cylinders.

10. A method for a multi-fuel engine, comprising:
during a first condition, injecting a mixture of diesel and hydrogen to a cylinder of the engine in at least one stroke of a four stroke combustion cycle and compression igniting the mixture;
during a second condition,
injecting only hydrogen to the cylinder of the engine in at least one stroke of a four stroke combustion cycle and compression igniting the hydrogen, and continue injecting only hydrogen to the cylinder via a direct fuel injector coupled to the cylinder for a pre-calibrated number of engine cycles,
then responsive to injecting only hydrogen to the cylinder via the direct fuel injector for the pre-calibrated number of engine cycles, inject a liquid fuel from the same direct fuel injector that previously injected only hydrogen; and
during the second condition, supplying an amount of exhaust gas recirculation (EGR) to the cylinder;
wherein the amount of EGR is adjusted based on the amount of hydrogen injected into the cylinder.

11. The method of claim 10, wherein the first condition includes an engine temperature being lower than a threshold engine temperature and the second condition includes the engine temperature being higher than the threshold engine temperature and a level of hydrogen in a fuel reservoir being higher than a threshold level.

12. The method of claim 10, wherein the direct fuel injector is a high pressure direct injector coupled to the cylinder.

13. The method of claim 10, wherein during the second condition, for each engine cycle, the hydrogen is injected in two or more batches.

14. The method of claim 11, wherein the amount of EGR is adjusted based on one or more of an engine load and an engine speed.

15. The method of claim 14, wherein during the first condition, adjusting a ratio of hydrogen to diesel based on one or more of a torque demand, the engine speed, the engine temperature, and the level of hydrogen in the fuel reservoir.

16. The method of claim 10, further comprising, during the second condition, suspending injection of hydrogen and injecting diesel through the direct fuel injector for one or more engine cycles.

17. The method of claim 10, further comprising, during the second condition, switching from injecting only hydrogen to the cylinder to injecting one of the mixture of diesel and hydrogen, and only diesel in response to increase in torque demand to above a threshold demand.

18. A system for an engine, comprising:
a controller storing instructions in non-transitory memory that, when executed, cause the controller to:
during an engine start, operate the engine by combusting only diesel in each engine cylinder of the engine using a four-stroke cycle, wherein the engine comprises multiple engine cylinders;
in response to an engine temperature increasing to above a threshold temperature, switch to operating the engine by combusting only hydrogen in each cylinder of the engine using a four-stroke cycle; and
continue injecting only hydrogen to each cylinder of the engine via a corresponding direct fuel injector coupled to each cylinder of the engine for a pre-calibrated number of engine cycles; then
responsive to injecting only hydrogen to each cylinder via the corresponding direct fuel injector for the pre-calibrated number of engine cycles, inject a liquid fuel from the same corresponding direct fuel injectors that previously injected only hydrogen to lubricate the corresponding direct fuel injectors, wherein the liquid fuel is diesel, and wherein the pre-calibrated number of engine cycles corresponds to each injector's propensity for loss of lubrication.

19. The system of claim 18, wherein each of the diesel and the hydrogen is direct injected to each cylinder of the engine under high pressure, and compression ignited without spark.

20. The system of claim 18, wherein the controller includes further instructions to: during injecting only hydrogen to each cylinder, supply an amount of exhaust gas recirculation (EGR) to each cylinder, the amount of EGR mixing with the hydrogen within each cylinder, wherein the amount of EGR is adjusted based on the amount of hydrogen injected into each cylinder.

* * * * *